US006307658B1

(12) United States Patent
Chiaroni et al.

(10) Patent No.: US 6,307,658 B1
(45) Date of Patent: *Oct. 23, 2001

(54) METHOD AND APPARATUS FOR DECOMPRESSING PULSES MAKING UP A BINARY OPTICAL SIGNAL

(75) Inventors: Dominique Chiaroni, Antony; Corinne Chauzat, Creteil; Michel Sotom, Paris; Dominique de Bouard, Ste-Genevieve-des-bois, all of (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/066,999

(22) Filed: Apr. 27, 1998

(30) Foreign Application Priority Data

Apr. 28, 1997 (FR) .................................................. 97 05207

(51) Int. Cl.[7] .................................................. H04J 14/08
(52) U.S. Cl. .................... 359/140; 359/124; 359/130; 359/135; 359/161; 359/138; 359/139; 359/158; 359/181; 359/184
(58) Field of Search ................................ 359/124, 130, 359/140, 161, 135, 138, 139, 158, 181, 184

(56) References Cited

U.S. PATENT DOCUMENTS

| 5,121,240 | * | 6/1992 | Acampora | 359/138 |
| 5,339,186 | | 8/1994 | Weverka . | |
| 5,589,967 | * | 12/1996 | Auffret | 359/123 |
| 5,636,045 | * | 6/1997 | Okayama et al. | 359/140 |
| 5,737,106 | * | 4/1998 | Sansonetti et al. | 359/140 |
| 5,841,560 | * | 11/1998 | Prucnal | 359/138 |
| 5,896,212 | * | 4/1999 | Sotom et al. | 359/125 |
| 5,953,142 | * | 9/1999 | Chiaroni et al. | 359/127 |
| 5,987,197 | * | 11/1999 | Kersey | 385/24 |
| 6,151,146 | * | 11/2000 | Chiaroni et al. | 359/158 |

FOREIGN PATENT DOCUMENTS

| B6861894 | 2/1995 | (AU) . |
| 0635991A1 | 1/1995 | (EP) . |

OTHER PUBLICATIONS

K. Nonaka et al. "Simultaneous Time–and Wavelength Domain Optical Demultiplexing of NRZ Signals by Using a Side–Injection–Light–Controlled Bistable Laser Diode", Electronics Letters, vol. 31, No. 21, Oct. 12, 1995, p. 1865/1866.

S. Suzuki et al, "An Experiment on High–Speed Optical Time–Division Switching", Journal of Lightwave Technology, vol. LT–4, No. 7, Jul. 1986, pp. 894–899.

* cited by examiner

*Primary Examiner*—Leslie Pascal
*Assistant Examiner*—Hanh Phan
(74) *Attorney, Agent, or Firm*—Sughrue, Mion, Zinn, Macpeak & Seas, PLLC

(57) ABSTRACT

In communications systems having optical networks, data rates in the electrical domain can be matched to data rates in the optical domain by means of time-division multiplexing, with the pulses forming the transmitted optical data being compressed. A method performs the necessary pulse decompression on reception in all-optical manner. The method includes forming q auxiliary signals respectively obtained by amplitude modulating each of q optical carrier waves having different wavelengths by the received signal, and superposing q delayed auxiliary signals obtained by applying delays to the auxiliary signals such that any two consecutive delayed auxiliary signals are offset in time by the duration of the pulses making up the received signal.

10 Claims, 10 Drawing Sheets

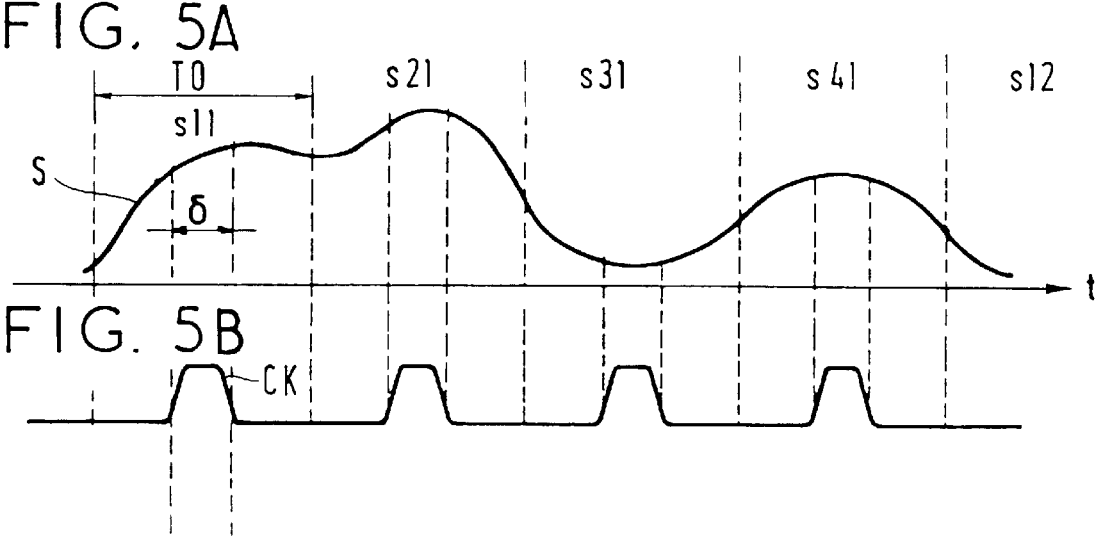
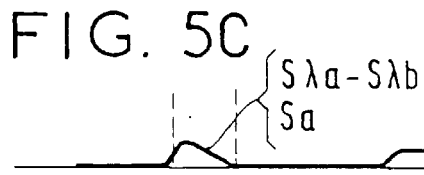
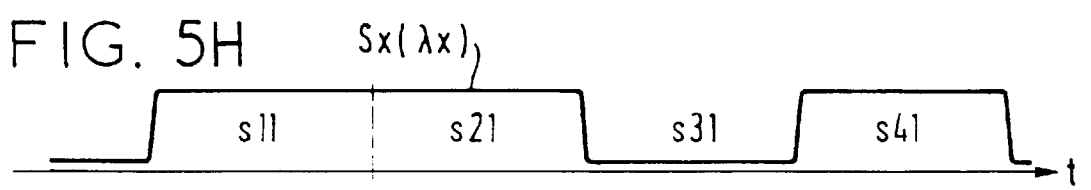

METHOD AND APPARATUS FOR DECOMPRESSING PULSES MAKING UP A BINARY OPTICAL SIGNAL

The invention relates to communications systems using optical networks.

BACKGROUND OF THE INVENTION

Generally, the information conveyed in such systems is binary data in the form of pulses clocked at a determined clock frequency. The amplitude levels of such pulses are representative of the binary data. Initially, the pulses are in electrical form, and they are then converted into an optical signal obtained by modulating the power (or the amplitude) of an optical carrier wave.

The advantage of optical systems is that the optical fibers that constitute the transmission links make it possible for much higher data rates to be achieved than those that can be achieved with electrical lines.

Similarly, there is a difference of about the same order of magnitude between the data-rate capacities of optical-domain systems and those of electrical-domain circuits. One problem is therefore to design electrical-to-optical conversion interfaces at the transmission end and optical-to-electrical conversion interfaces at the reception end that are capable of matching the data rates.

One solution consists in providing time-division multiplexing whereby a plurality of electrical signals to be transmitted are taken synchronously in parallel and are then transmitted serially through the network in the form of an optical time-division multiplex. On reception, the optical signals making up the multiplex are extracted by serial-to-parallel conversion. In addition, in order to make better use of the passband of the optical network, the pulses forming the transmitted data are advantageously compressed.

The conversion interfaces must also be suitable for accommodating the capabilities of electronics. Furthermore, the compression and decompression operations, and the parallel-to-serial and serial-to-parallel conversion operations must be cheap to perform.

OBJECTS AND SUMMARY OF THE INVENTION

An object of the invention is to solve the particular problem of decompression, and, for this purpose, the invention proposes a method of performing such decompression in all-optical manner.

To this end, the invention provides a method of decompressing pulses making up a received binary optical signal, said pulses being contained in successive bit times of duration T, and having a duration Δ not greater than T/q, where q is an integer number not less than 2, said method consisting, in particular, in:

forming q auxiliary signals respectively obtained by amplitude modulating each of q optical carrier waves having different wavelengths as a function of the amplitude of said received signal; and forming a decompressed signal constituted by superposing q delayed auxiliary signals obtained by applying delays to said auxiliary signals such that any two consecutive delayed auxiliary signals are offset in time substantially by said duration Δ.

Thus, the invention makes use of the spectrum dimension of the optical domain to prevent interferometric noise from being created.

In a first possibility, said auxiliary signals are superposed before said delays are applied to them, by making use of their different wavelengths.

In an another possibility, said delays are applied to said auxiliary signals before they are superposed.

Although both of these possibilities operate in equivalent manner in principle, the first possibility makes implementation cheaper as explained below.

The invention further provides apparatus for implementing the above defined method. The apparatus comprising:

first means for amplitude modulating q optical carrier waves having different wavelengths, the amplitude modulation being performed as a function of the amplitude of said received signal; and second means for forming a decompressed signal constituted by superposing q delayed auxiliary signals obtained by applying delays to said auxiliary signals such that any two consecutive delayed auxiliary signals are offset in time substantially by said duration Δ.

Finally, the invention further provides a communications system comprising an optical network, at least one transmitter terminal provided with time-division multiplexing apparatus, and at least one receiver terminal provided with time-division demultiplexing apparatus, wherein said time-division demultiplexing apparatus includes decompression apparatus as defined above.

BRIEF DESCRIPTION OF THE DRAWINGS

Other aspects and advantages of the invention appear from the following description given with reference to the figures, in which:

FIGS. 5A–5H comprises timing diagrams serving to explain how the apparatus shown in FIG. 4 operates;

MORE DETAILED DESCRIPTION

Figure 1:
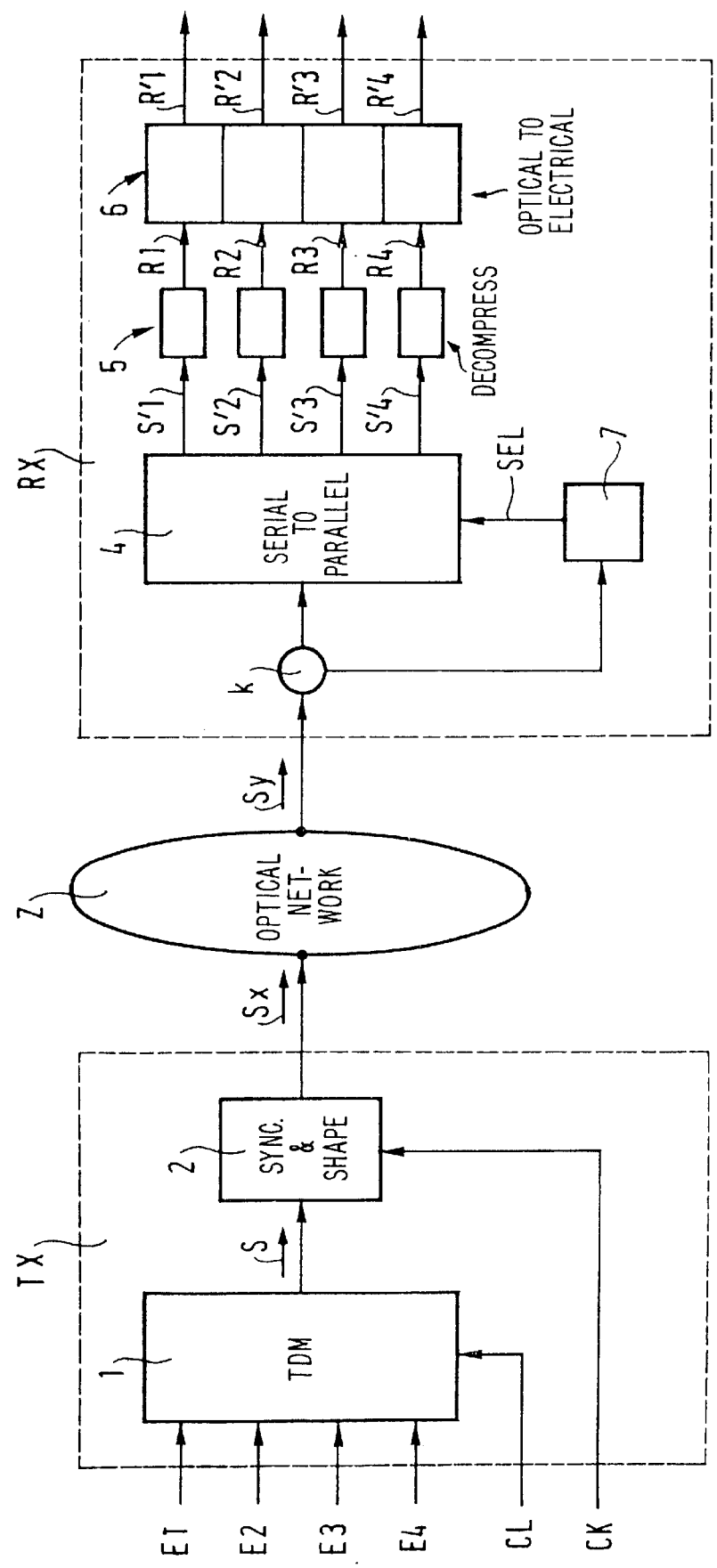
FIG. 1 is a diagram showing an optical communications system of the invention.

FIG. 1 is a diagram showing a communications system having an optical network. The system is made up of one or more transmitter terminals TX connected to one or more receiver terminals RX via an optical network Z.

In the general case, the transmitter terminal TX receives n input signals in electrical form or in optical form. By way of example, let n=4.

The input signals E1–E4 are synchronous signals that represent binary data contained in successive bit times of duration T. They are received by time-division multiplexing apparatus 1 which is controlled by a compression clock signal CL. The apparatus 1 delivers a multiplex signal S to synchronizing and shaping apparatus 2 which is controlled by a sampling clock signal CK.

The apparatus 2 delivers the output signal Sx to the network Z via a suitable interface (not shown).

The signal Sx transmitted over the network Z becomes an input signal Sy for the receiver terminal RX. A coupler k receives the input signal Sy, and delivers a portion of said input signal to selection control apparatus 7 and a portion of said input signal to time-division demultiplexing apparatus constituted by a serial-to-parallel conversion stage 4 followed by decompression stages 5. The apparatus 4 delivers compressed demultiplexed signals S'1–S'4 corresponding to respective ones of the input signals E1–E4 of the transmitter terminal TX. The compressed demultiplexed signals S'1–S'4 are applied to respective ones of the decompression apparatuses 5 of the invention which deliver corresponding decompressed signals R1–R4. The signals R1–R4 can then be converted into electrical signals R'1–R'4 by converters 6.

A more detailed description follows of the various elements of the communications system and of how they operate.

Figure 2:
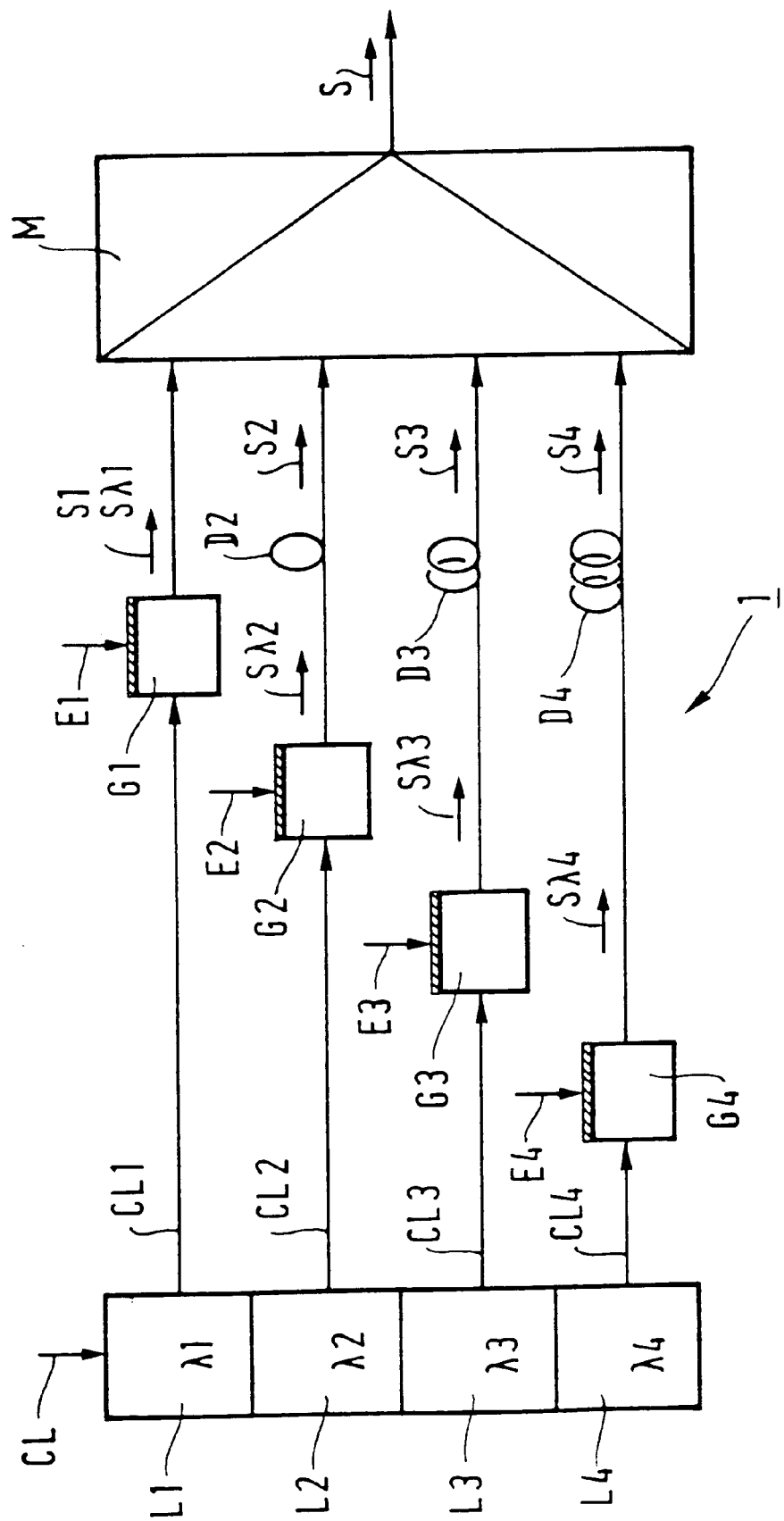
FIG. 2 shows an embodiment of time-division multiplexing apparatus.
Figure 3A:
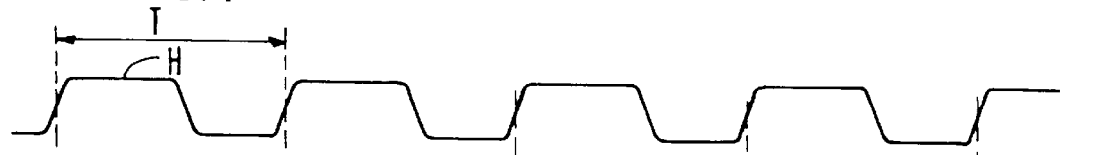
FIGS. 3A–3H comprises timing diagrams making it possible to explain how the apparatus shown in FIG. 2 operates.
Figure 3B:
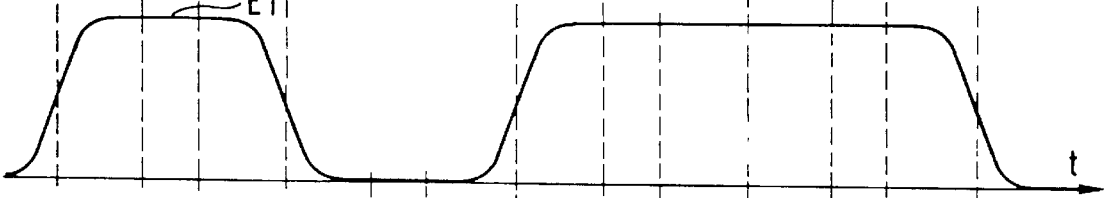
Figure 3C:
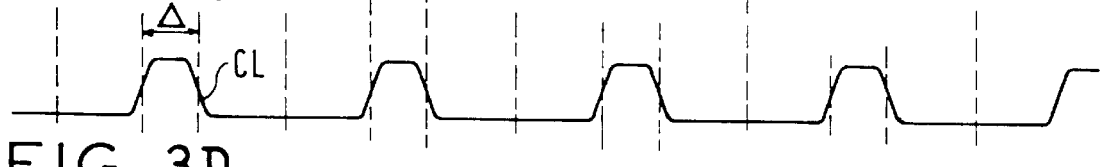
Figure 3D:
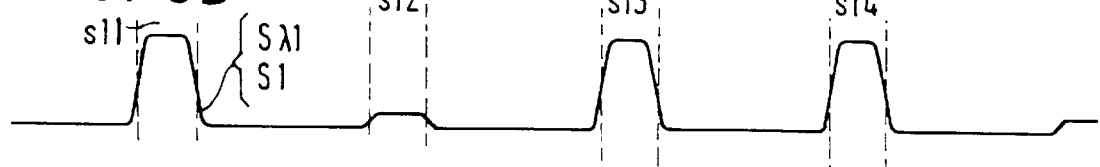
Figure 3E:
Figure 3F:
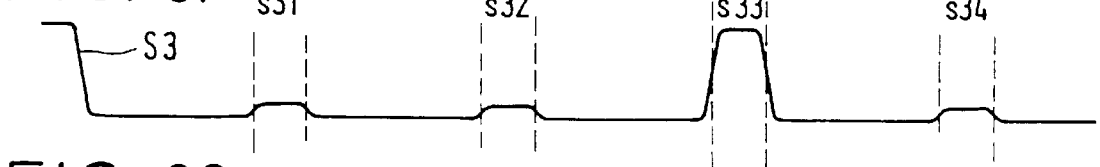
Figure 3G:
Figure 3H:

FIG. 2 shows an embodiment of the time-division multiplexing apparatus in the particular case of there being four input signals E1–E4 and of them being electrical signals.

The apparatus includes four light sources L1–L4 suitable for generating carrier waves having different wavelengths $\lambda 1-\lambda 4$. The sources can be modulated by the compression clock signal CL, and they deliver respective compression optical signals CL1–CL4.

In practice, the sources L1–L4 comprise laser oscillators that generate respective ones of the carrier waves. When the signal CL is electrical, the sources L1–L4 may be constituted by laser oscillators which are electrically powered as a function of the signal CL. They may also be lasers integrally including modulators. If the signal CL is an optical signal, the sources L1–L4 may be constituted by mode-locked lasers.

The compression optical signals CL1–CL4 carried by respective ones of the wavelengths $\lambda 1-\lambda 4$ are received by respective ones of the optical gates G1–G4 controlled by respective ones of the input electrical signals E1–E4. The gates G1–G4 deliver compressed input signals $S\lambda 1-S\lambda 4$. A first inlet of a multiplexer M receives $S\lambda 1$ directly, while its other inlets receive $S\lambda 2$, $S\lambda 3$, and $S\lambda 4$ via delay lines D2, D3, D4. The delay lines D2–D4 are dimensioned to create respective delays of T/4, T/2, and 3T/4. Thus, the multiplexer M receives delayed signals S1–S4 such that any two consecutive delayed signals are offset in time by substantially T/4. In the general case of there being n input signals, the delays are T/n, 2T/n, 3T/n ... (n–1)T/n. Thus the delayed signals S1–Sn are such that any two consecutive delayed signals are offset in time by substantially T/n.

The multiplexer M superposes the delayed signals S1–S4 so as to output the time-division multiplex signal S.

Operation of the apparatus shown in FIG. 2 is described below with reference to the timing diagrams a) to h) shown in FIG. 3.

Timing diagram b) shows an example of how the amplitude of an input signal E1, assumed to be of the NRZ type, varies as a function of time. Said amplitude is modulated between high levels and low levels that represent binary data contained in successive bit times of duration T set by a clock signal H shown in timing diagram a). In this example, the signal successively represents the binary data 1, 0, 1, 1.

The compression clock signal CL shown in timing diagram c) is made up of pulses of frequency 1/T and of width equal to a determined duration $\Delta$. In the general case of there being n input signals to be multiplexed, the duration $\Delta$ must be no greater than T/n. In the particular case of the multiplex signal S to be delivered being of the NRZ type, the duration $\Delta$ is chosen to be substantially equal to T/n. In the example shown where n=4, $\Delta$=T/4. The signal CL is positioned relative to the input signals E1–E4 so that the pulses which make it up appear in the vicinity of the middles of the bit times T.

The sources L1–L4 modulated by the signal CL deliver compression optical signals CL1–CL4 carried by respective ones of the wavelengths $\lambda 1-\lambda 4$ and whose amplitudes reproduce the amplitude of the signal CL.

Each compression optical signal, e.g. CL1 is then modulated by the corresponding optical gate G1 as a function of the amplitude of the input signal E1 that controls it. The gate G1 then delivers the compressed input signal $S\lambda 1$ as shown in timing diagram d). In analogous manner, the gates G2 to G4 deliver corresponding compressed input signals $S\lambda 1-S\lambda 4$ (not shown in FIG. 3). After passing through the delay lines D2–D4, these signals become delayed signals S1–S4.

Examples of delayed signals S1–S4 are shown in timing diagrams d) to g). In this example, the signal S1 represents the successive items of binary data s11, s12, s13, s14, the signal S2 represents the binary data s21, s22, s23, s24, the signal S3 represents the binary data s31, s32, s33, s34, and the signal S4 represents the binary data s41, s42, s43, s44.

The multiplex signal S which results from these signals being superposed is shown in timing diagram h).

In this example, $\Delta$ is chosen to be equal to T/4, which means that the signal S is made up of contiguous pulses that are amplitude modulated as a function of the input signals E1–E4. For lower values of $\Delta$, non-contiguous pulses are obtained. For example, by choosing $\Delta$ to be equal to T/2n, NRZ-to-RZ conversion is performed simultaneously.

It may be noted that the embodiment shown in FIG. 2 makes it possible to use simple means simultaneously to compress the pulses, to perform parallel-to-serial conversion, and to perform electrical-to-optical conversion.

Figure 4:
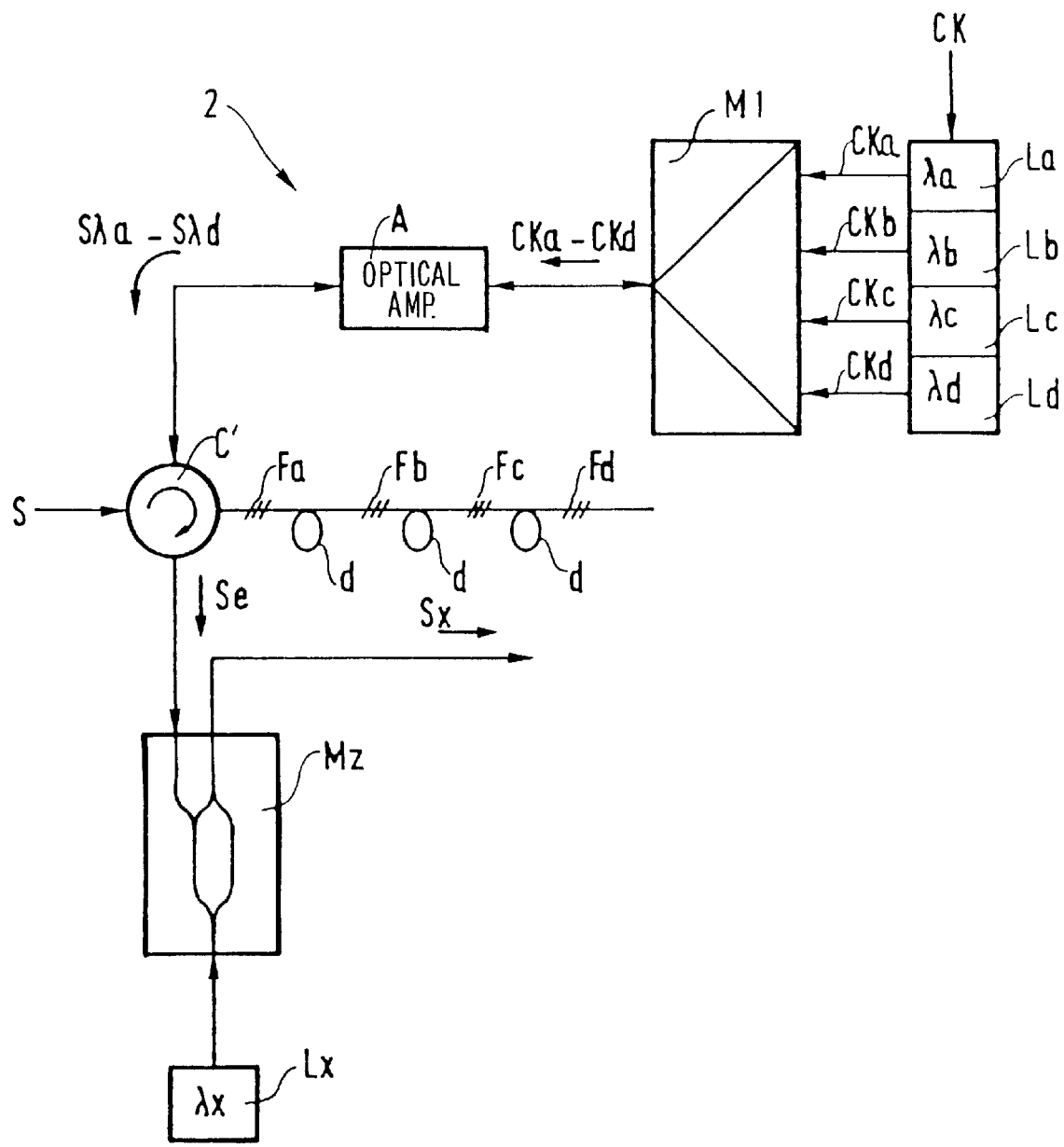
FIG. 4 shows synchronizing and shaping apparatus.

FIG. 4 shows an embodiment of the re-synchronizing and shaping apparatus 2.

It includes a first stage receiving the multiplex signal S as an input signal and delivering a re-synchronized signal Se. This stage includes a four-port circulator C'. A first port receives the signal S, a second port is connected to a semiconductor optical amplifier A, a third port is connected to delay apparatus constituted by filters Fa, Fb, Fc, and Fd connected in cascade via delay lines d, and a fourth port delivers the re-synchronized signal Se.

The amplifier A is provided with a first port connected to the second port of the circulator C', and with a second port opposite from the first port and connected to the outlet of a multiplexer M1. The amplifier A is typically a semiconductor optical amplifier.

The multiplexer M1 receives sampling optical signals CKa, CKb, CKc, CKd delivered by respective ones of four light sources La, Lb, Lc, Ld suitable for generating carrier waves having different wavelengths $\lambda a - \lambda d$ and modulated by a sampling clock signal CK.

In the general case, the multiplexer M1 can receive p sampling optical signals as input, but, by way of non-limiting example, p=4.

In the general case, since the bit time of the input signal S is T0=T/n, the sampling clock signal CK is made up of pulses of determined duration δ not greater than T0/p, at the frequency 1/T0. In the particular case of the re-synchronized signal Se to be delivered being of the NRZ type, the determined duration δ is substantially equal to T0/p.

The filters Fa, Fb, Fc, and Fd are stop filters tuned to reflect respective ones of the wavelengths λa–λd. To take into account the go and return paths of the waves, each of the delay lines d is dimensioned to create a delay substantially equal to one half of the duration δ.

The re-synchronized signal Se is applied to the input of a second stage constituted by a wavelength converter having an interferometer structure MZ associated with a laser oscillator Lx. The interferometer structure MZ shown is of the Mach-Zehnder type. It comprises two branches conveying respective coherent waves output by the oscillator Lx and coupled to deliver the output signal Sx. One of the branches further receives the input signal Se. This branch includes a medium whose refractive index varies as a function of the total optical power that it conveys. Thus, variations in the power of the input signal modulate the refractive index, and the two coherent waves can interfere destructively or constructively as a function of the power level of the input signal. A detailed description of this type of converter is given, for example, in the article entitled "Wavelength Conversion by Optimized Monolithic Integrated Mach-Zehnder Interferometer", C. Joergensen et al, IEEE PHOTONICS TECHNOLOGY LETTERS, VOL. 8, No. 4, April 1996.

Operation of the apparatus shown in FIG. 4 is described below with reference to the timing diagrams a) to h) in FIG. 5.

Timing diagram a) shows an example of how the amplitude of the multiplex signal S of the preceding example varies as a function of time. Said amplitude is modulated between high levels and low levels that represent binary data s11, s21, S31, S41, s12 contained in successive bit times of duration T0. In this example, the signal successively represents the binary data 1, 1, 0, 1, 0.

Timing diagram b) represents the sampling clock signal CK. It is made up of a succession of pulses of duration δ and of frequency 1/T0. In the example shown, the re-synchronized signal Se is of the NRZ type, where p=4, and δ=T0/4. The signal CK is positioned relative to the input signal S so that the pulses which make it up appear in the vicinity of the middles of the bit times T0.

The sources La–Ld modulated by the signal CK deliver sampling optical signals CKa–CKd (not shown) carried by respective ones of the wavelengths λa–λd and whose amplitudes reproduce the amplitude of the signal CK.

The sampling signals CKa–CKd are superposed by the multiplexer M1, and they are then injected into the amplifier A via its second port. Via its first port, the amplifier A receives the input optical signal S output by the second port of the circulator C'. The signal S is thus injected in the opposite direction. Since the amplifying medium is saturable, the gain applied to the signals CKa–CKd is modulated by the amplitude of the multiplex S. The first port of the amplifier A then delivers sampled signals Sλa–Sλd to the second port of the circulator C', which sampled signals are carried by respective ones of the wavelengths λa–λd, as shown in timing diagram c).

The sampled signals Sλd–Sλd are applied to the delay apparatus comprising the filters Fa–Fd and the delay lines d via the third port of the circulator C'. Since the filters Fa–Fd are stop filters set to respective ones of the wavelengths λa–λd, and since each of the delay lines d is dimensioned to create a delay equal to T0/2p T0/8, the delay apparatus reflects the delayed signals Sa–Sd carried by respective ones of the wavelengths λa–λd, so that any two consecutive delayed signals are offset in time by substantially T0/p=T0/4, as shown respectively in timing diagrams c) to f). The fourth port of the circulator C' then delivers the re-synchronized signal Se which is the superposition of the signals Sa–Sd as shown in timing diagram g).

It can be observed that low levels in the input signal S correspond to high levels in the re-synchronized signal Se, and vice versa. By means of the semiconductor amplifier A, the high levels of the signal Se are well equalized. However, the low levels of the signal Se still have non-zero power levels, which means that there is room to improve the extinction ratio.

This defect is easy to correct by means of the wavelength converter having an interferometer structure MZ in the second stage. Said second stage then delivers the fully reshaped output signal Sx carried by the wavelength λx, as shown in timing diagram h).

It may be noted that the effect of the first stage equalizing the high levels of the re-synchronized signal Se is to stabilize operation of the converter of interferometer structure.

Figure 6:
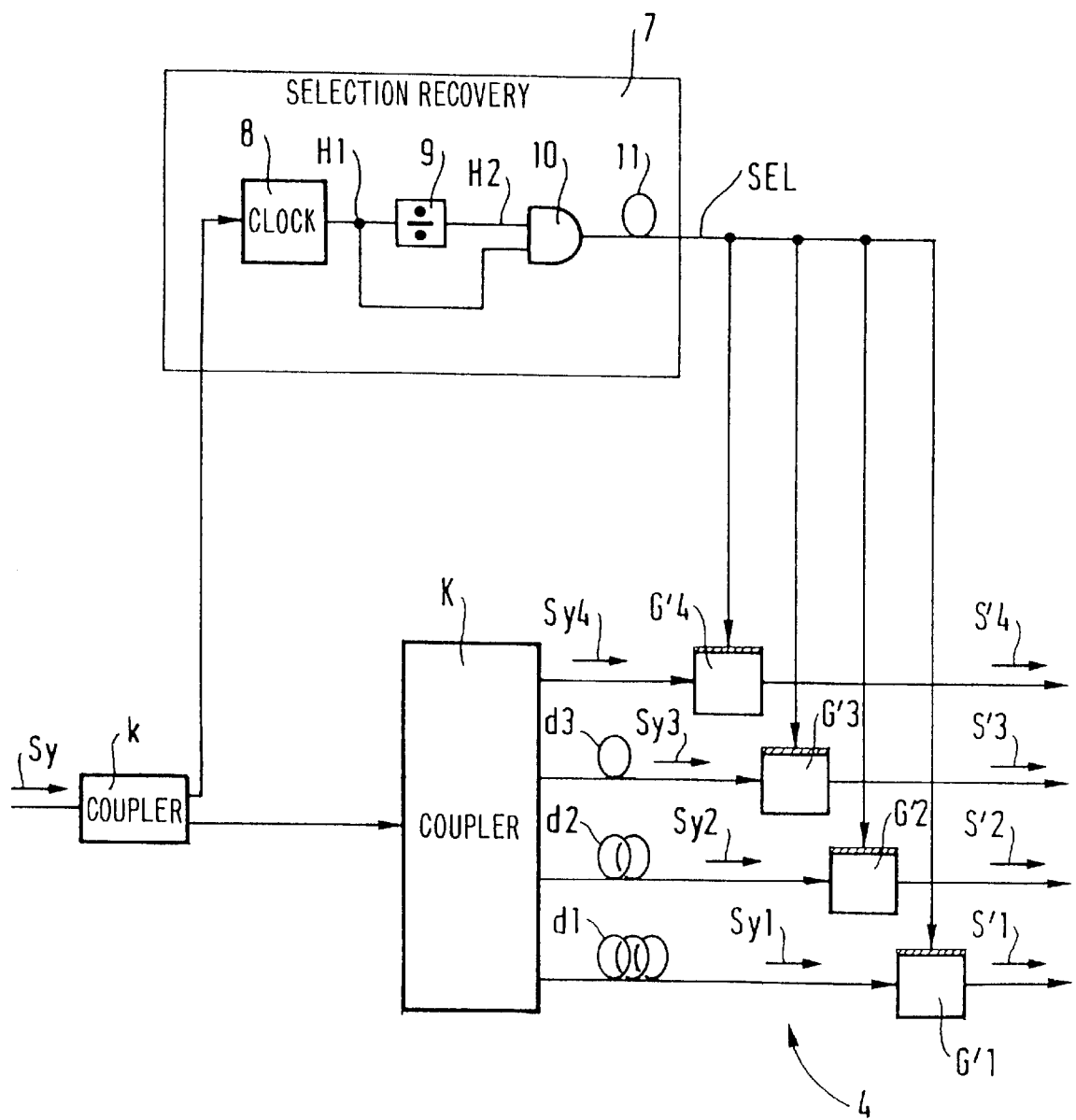
FIG. 6 shows apparatus for performing serial-to-parallel conversion on the time-division multiplex received by a receiver terminal of the communications system.
Figure 7A:
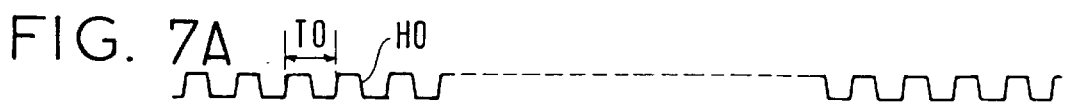
FIGS. 7A–7L comprises timing diagrams serving to explain how the apparatus shown in FIG. 6 operates.
Figure 7B:
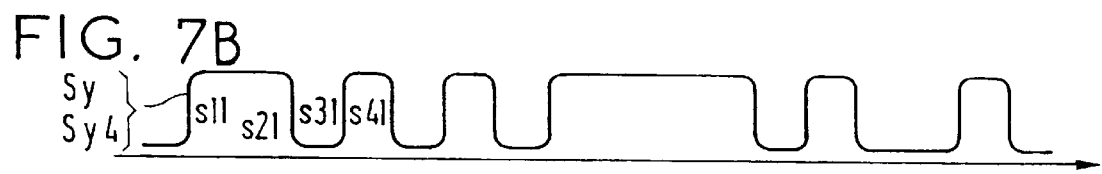
Figure 7C:
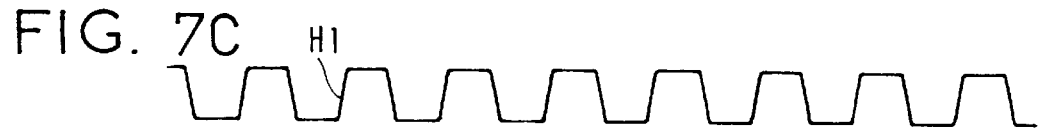
Figure 7D:
Figure 7E:
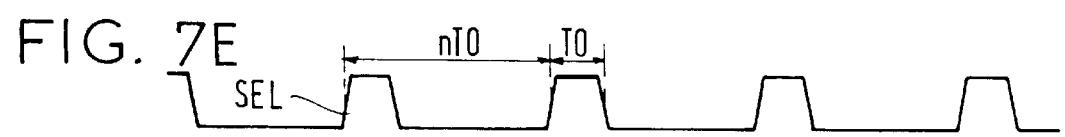
Figure 7F:
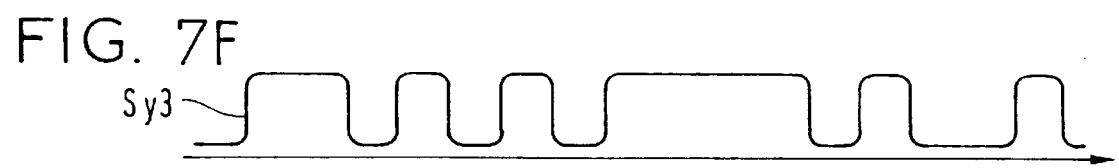
Figure 7G:
Figure 7H:
Figure 7I:
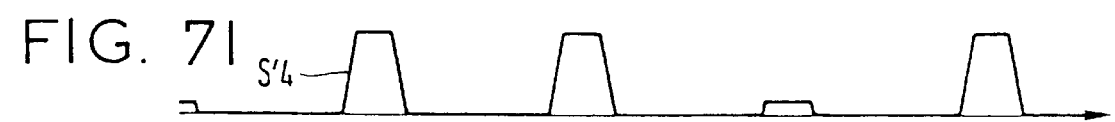
Figure 7J:
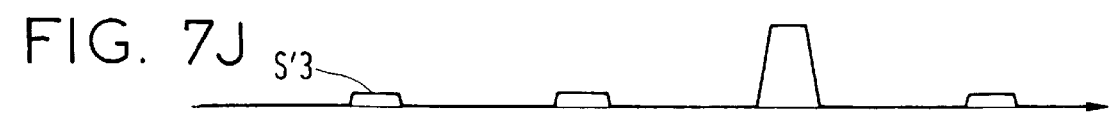
Figure 7K:
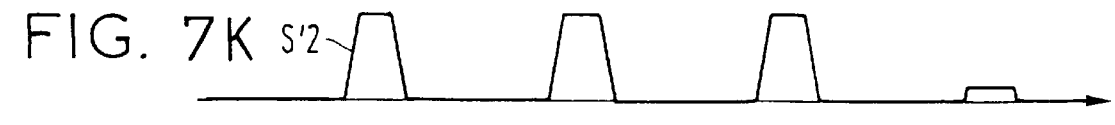
Figure 7L:

FIG. 6 shows an embodiment of the serial-to-parallel conversion stage 4 of the time-division demultiplexing apparatus of a receiver terminal RX. At its inlet, the stage includes a coupler k receiving the input signal Sy and delivering a portion of this signal to another coupler K, and delivering another portion of said signal to selection control apparatus 7.

The apparatus 7 is designed to deliver a selection signal SEL made up pulses of duration T0=T/n, of frequency 1/nT0=1/T, and synchronized relative to the input signal Sy so that each pulse covers one bit time of said signal.

For this purpose, the apparatus 7 includes conventional clock signal recovery apparatus 8 delivering an electrical clock signal Hi on the basis of the optical signal Sy, the electrical signal having a frequency that is one half of the frequency of the base clock H0 of the signal Sy. On the basis of the signal H1, a suitable logic circuit delivers the above-defined selection signal SEL.

Thus, when n=4, the signal H1 is applied both to the inlet of a halving frequency divider 9 delivering the signal H2, and also to the inlet of an AND gate 10 whose second inlet receives the signal H2. The gate 10 delivers the selection signal SEL via delay apparatus 11, e.g. having an adjustable delay, making it possible to position the signal SEL properly relative to the signals that it controls.

In the general case of the received signal Sy being a time-division multiplex corresponding to n multiplexed signals, the coupler K is provided with n outlets delivering n sample-taking signals corresponding to respective ones of n optical gates via delay lines. Each optical gate is controlled by the selection signal SEL. Thus, in the above-discussed example, the coupler K is provided with four outlets. One of the outlets is connected directly to the gate G'4 and the other three outlets are connected to respective ones of the gates G'1, G'2, G'3 via respective delay lines d1, d2, d3. The optical gates G'1–G'4 receive delayed sample-taking signals Sy1–Sy4, and deliver respective ones of the compressed demultiplexed signals S'1–S'4.

The timing diagrams a) to 1) in FIG. 7 make it possible to explain how the apparatus shown in FIG. 6 operates. The base clock H0 is shown in timing diagram a). Timing diagram b) shows the received signal Sy. On the basis of this signal, the clock signal recovery apparatus 8 generates the clock signal H1 shown in timing diagram c). The halving frequency divider 9 delivers the signal H2 shown in timing diagram d), and the AND gate 10 delivers the selection signal SEL shown in timing diagram e).

The sample-taking signals correspond to the zero-delay signal Sy4 shown in timing diagram b), whereas the sample-taking signals Sy3, Sy2, Sy1 that are indeed delayed are shown respectively in timing diagrams f), g), and h). The latter signals are delayed relative to the signal Sy4 respectively by T0, 2T0, and 3T0. To process a multiplex of n signals, delayed sample-taking signals are created in the same way that are mutually offset by T0, 2T0, ..., (n−1)T0.

Since the signal SEL is applied to the control electrodes of the gates G'1–G'4, the output signals obtained are the compressed demultiplexed signals S'4, S'3, S'2, and S'1 shown respectively in the timing diagrams i), j), k), and l).

Figure 8:
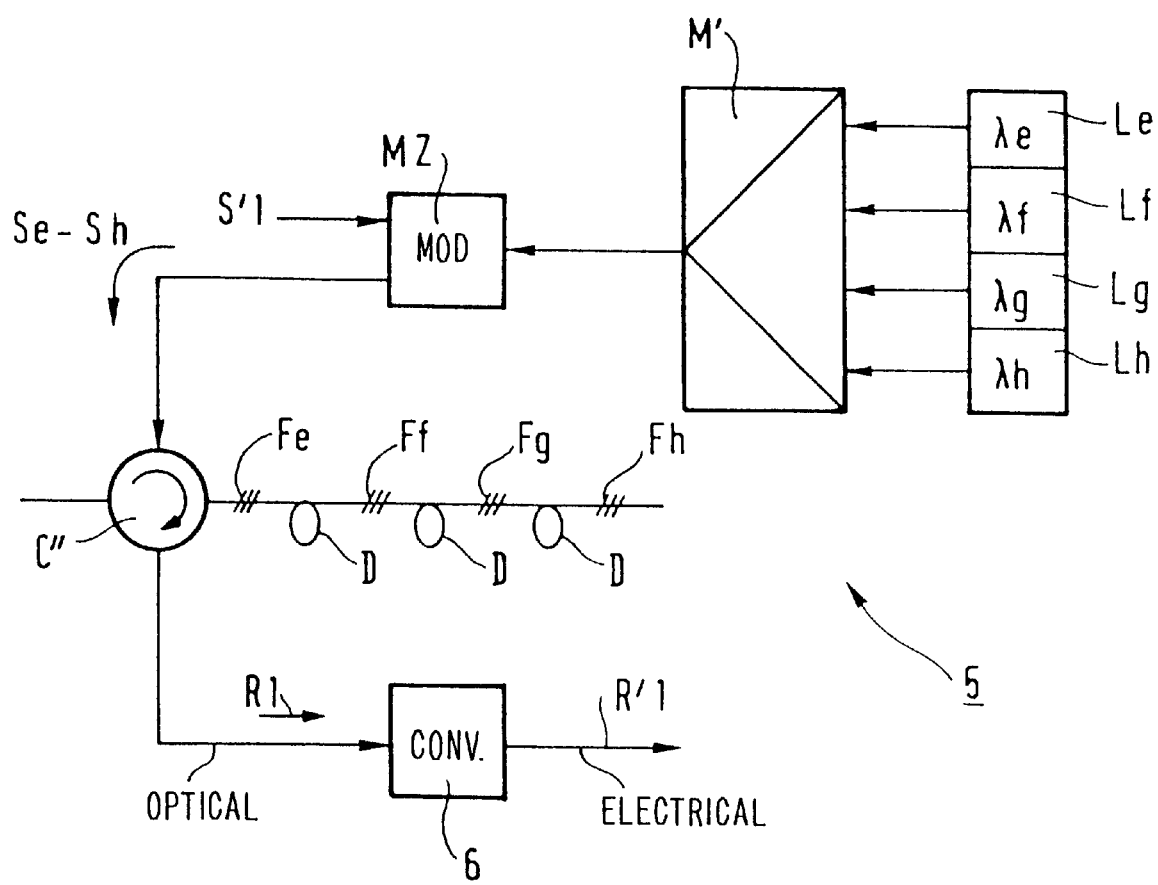
FIG. 8 shows apparatus of the invention for decompressing one of the signals extracted from the time-division multiplex received by the receiver terminal.
Figure 9A:
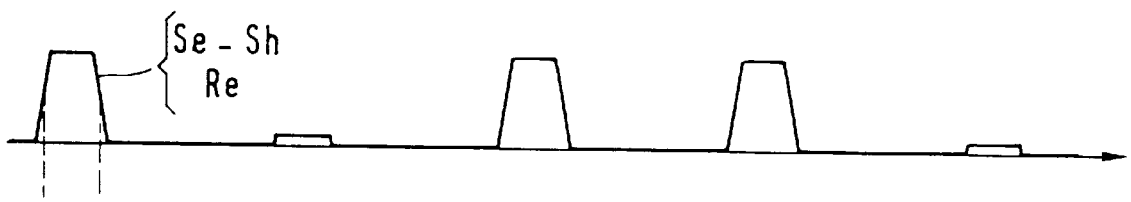
FIGS. 9A–9E comprises timing diagrams making it possible to explain how the apparatus shown in FIG. 8 operates.
Figure 9B:
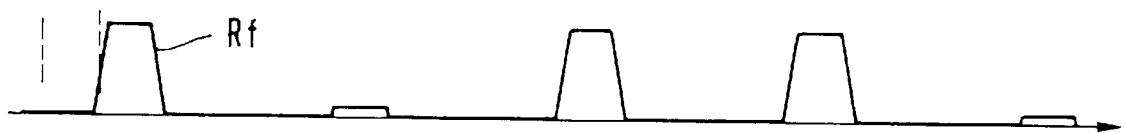
Figure 9C:
Figure 9D:
Figure 9E:
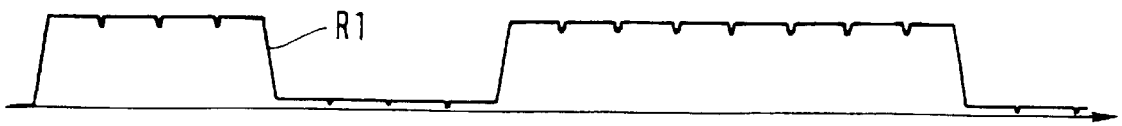

FIG. 8 shows an embodiment of one of the decompression apparatuses 5 of the invention in the time-division demultiplexer. The apparatus includes a modulator MZ' that receives firstly one of the compressed demultiplexed signals S'1 and secondly a superposition of carrier waves having different wavelengths λe–λh, the superposition being delivered by laser oscillators Le–Lh via a multiplexer M'.

In the general case of T being the bit time and Δ being the pulse duration, and provided that T is not less than 2Δ, the number of oscillators can be a value a lying in the range 2 to T/Δ.

In the particular case of the decompressed signal to be delivered being of the NRZ type, q is the integer that is closest to T/Δ.

Thus, in the context of the above-described time-division multiplexing, Δ=T/n=T0 and an NRZ-type decompressed signal is obtained for q=n. The example shown corresponds to this case for n=4.

A circulator C" is provided with a first port connected to the outlet of the modulator MZ', with a second port connected to delay apparatus, and with a third port delivering a decompressed signal R1. The delay apparatus may be constituted by stop filters Fe–Fh connected in cascade via delay lines D. The filters Fe–Fh are tuned to reflect respective ones of the wavelengths λe–λh. To take into account the go and return paths of the waves, each of the delay lines D is dimensioned to create a delay substantially equal to Δ/2=T/2n=T0/2. In the general case, the delay apparatus includes a stop filters tuned to reflect respective ones of the a different wavelengths and coupled in cascade via q−1 delay lines D, each of which is dimensioned to create a delay substantially equal to Δ/2.

The signal R1 is applied to an opto-electronic converter 6 constituted, for example, by a photodiode, to deliver the electrical output signal R'1.

The modulator MZ' may be of interferometer structure, e.g. of the Mach-Zehnder type, analogous to the structure described with reference to FIG. 4. However, to achieve as high an extinction ratio as possible, the structure must be dimensioned and/or biassed to perform constructive interference when the power level of the input signal S'1 is high.

In operation, the modulator MZ' delivers auxiliary signals Se–Sh carried by respective ones of the wavelengths λe–λh, each auxiliary signal reproducing the modulation of the signal S'1, as shown in the timing diagram l) of FIG. 7. The auxiliary signals Se–Sh are reflected and delayed by the delay apparatus, and they are then fed back into the circulator C". The corresponding delayed signals Re–Rh have delays such that any two consecutive delayed auxiliary signals are offset in time substantially by the duration Δ.

The delayed signals Re–Rh are shown respectively in the timing diagrams a) to d) of FIG. 9. The circulator C" then delivers the superposition of these signals that constitutes the decompressed signal R1 shown in timing diagram e).

A variant embodiment consists in replacing the modulator of interferometer structure with a modulator using a semiconductor optical amplifying medium receiving the signal S'1 via a first port and the q superposed optical carrier waves via an opposite port. However, this solution gives rise to degradation of the extinction ratio.

Figure 10:
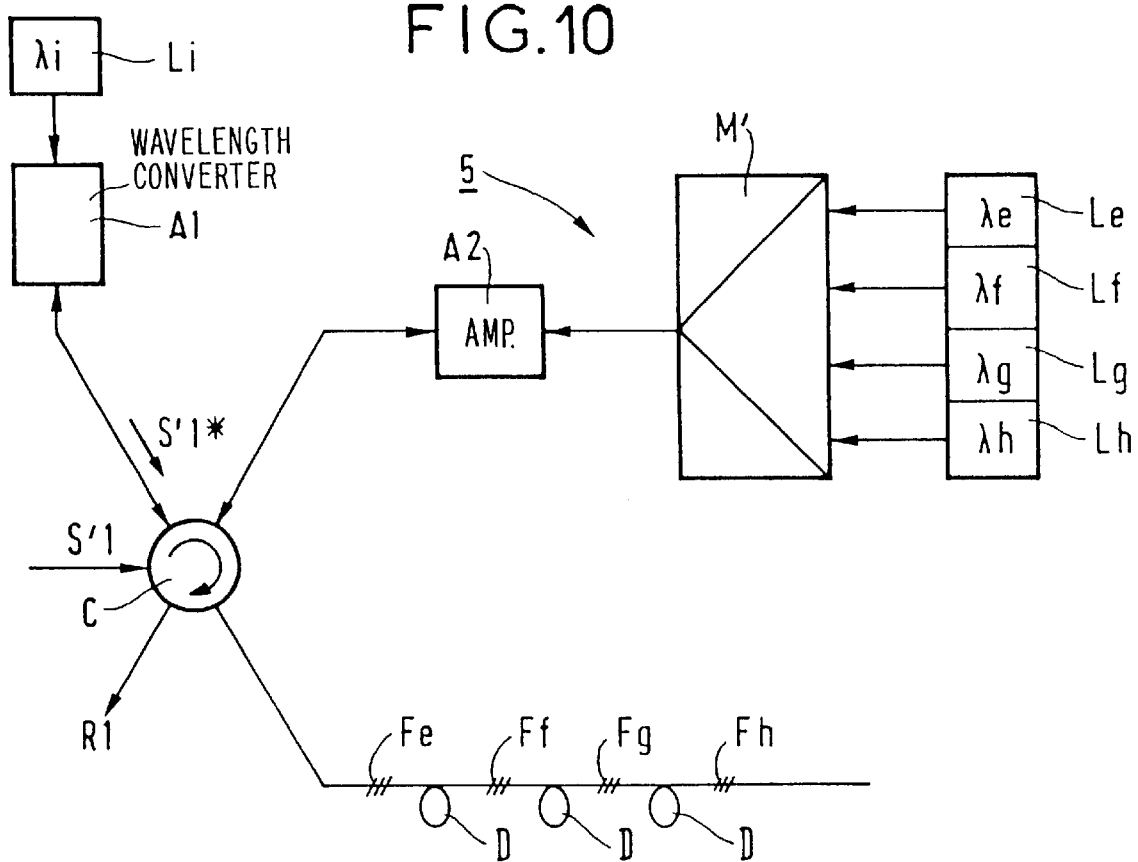
FIGS. 10 and 11 show variant embodiments of the decompression apparatus of the invention.

The variant shown in FIG. 10 may therefore be preferred. Compared with the embodiment shown in FIG. 8, this variant differs in that it has a five-port circulator C. A first port receives the signal S'1, a second port is connected to a wavelength converter A1, Li, a third port is connected to a first port of a semiconductor optical amplifier A2 whose opposite port receives the q superposed optical carrier waves, a fourth port is connected to the delay apparatus Fe–Fh, D, and a fifth port delivers the decompressed signal R1. The wavelength converter is constituted by another semiconductor amplifier A1 connected to the laser source Li. Its effect is to deliver to the amplifier A2 a signal S'1* that is complementary to the received signal S'1 and that is carried by the wavelength λi of the laser Li.

Operation is analogous to operation of the embodiment shown in FIG. 8.

Figure 11:
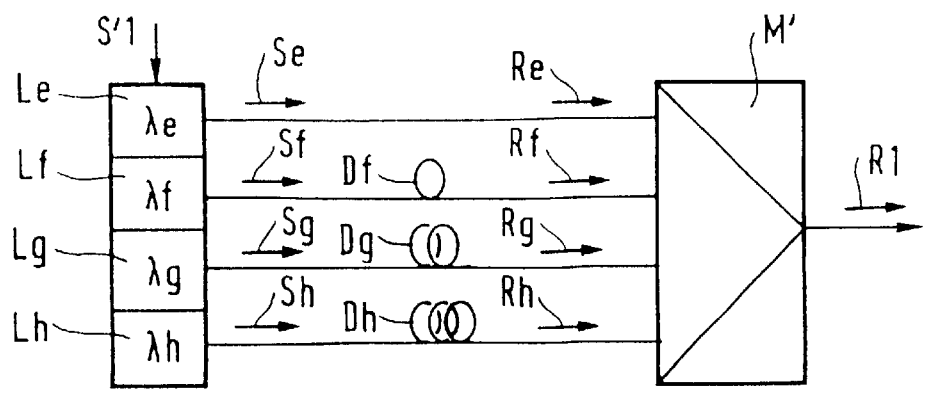

The other variant shown in FIG. 11 illustrates the case of applying the delays to the auxiliary signals Se–Sh prior to superposing them.

In this case, the light sources Le–Lh are constituted by mode-locked lasers controlled by the received signal S'1. They are connected to the inlets of the multiplexer M' via delay lines Df, Dg, Dh delivering the desired delays. The sources Le–Lh deliver the auxiliary signals Se–Sh directly, and the multiplexer M' which receives the delayed auxiliary signals Re–Rh delivers the decompressed signal R1.

The invention is not limited to the above-described embodiments. In particular, the delay apparatus of FIGS. 8 and 10 constituted by filters Fe–Fh connected in cascade via delay lines D may be replaced by equivalent apparatus constituted, for example, by a coupler connected in parallel with the filters via suitable different delay lines. This solution makes it easier to adjust the delays but gives rise to additional losses.

Finally, it may be noted that the invention makes it possible to perform as much decompression as may be desired, although the number of optical carrier waves is, in practice, limited. It is necessary merely to place a plurality of decompression apparatuses in cascade so as to widen the pulses in a plurality of steps, each of which is compatible with the technological limits of the apparatus concerned.

What is claimed is:

1. A method of decompressing pulses making up a received binary optical signal, said pulses being contained in successive signal bit times T of said signal, said pulses having a pulse duration Δ not greater than T/q, where q is an integer number not less than 2, said method comprising:

forming q auxiliary signals respectively obtained by amplitude modulating each of q optical carrier waves having different wavelengths as a function of the amplitude of said received signal whereby the same modulation information is represented in compressed form on each of said g optical carrier waves; and forming a decompressed signal constituted by superposing q delayed auxiliary signals obtained by applying delays to said auxiliary signals such that any two consecutive delayed auxiliary signals are offset in time substantially by said pulse duration.

2. A method according to claim 1, wherein said auxiliary signals are superposed before said delays are applied to them, by making use of their different wavelengths.

3. A method according to claim 1, wherein said delays are applied to said auxiliary signals before they are superposed.

4. A method according to claim 1, wherein q is an integer number lying in the vicinity of $T/\Delta$.

5. Apparatus for decompressing pulses making up a received binary optical signal, said pulses being contained in successive signal bit times T of said signal, said pulses having a pulse duration $\Delta$ not greater than $T/q$, where q is an integer number not less than 2, said apparatus comprising:

an auxiliary signal generator generating auxiliary signals by amplitude modulating q optical carrier waves having different wavelengths, the amplitude modulation being performed as a function of the amplitude of said received signal whereby the same amplitude modulation information is represented in compressed form on each of said q optical carrier waves; and a superposition circuit forming a decompressed signal by superposing q delayed auxiliary signals obtained by applying delays to said auxiliary signals such that any two consecutive delayed auxiliary signals are offset in time substantially by said pulse duration.

6. Apparatus according to claim 5, wherein said superposition circuit comprises:

delay apparatus formed of q stop filters tuned to reflect respective ones of said different wavelengths and coupled together in cascade via (q−1) delay lines, each of which is dimensioned to create a delay substantially equal to $\Delta/2$; and a coupler connecting the outlet of said auxiliary signal generator to said delay apparatus and so as to extract therefrom the waves that it reflects.

7. A communications system comprising an optical network, at least one transmitter terminal provided with time-division multiplexing apparatus, and at least one receiver terminal provided with time-division demultiplexing apparatus, wherein said timr-division demultiplexing apparatus includes decompression apparatus according to claim 5.

8. Apparatus for decompressing pulses making up a received binary optical signal, said pulses being contained in successive signal bit times T of said signal, said pulses having a pulse duration a not greater than T/q, where q is an integer number not less than 2, said apparatus comprising:

an auxiliary signal generator generating auxiliary signals by superposing q optical carrier waves having different wavelengths, and by amplitude modulating the q superposed optical carrier waves as a function of the amplitude of said received signal, whereby the same amplitude modulation information is represented in compressed form on each of said g optical carrier waves; and a superposition circuit forming a decompressed signal by superposing q delayed auxiliary signals obtained by applying delays to said auxiliary signals such that any two consecutive delayed auxiliary signals are offset in time substantially by said pulse duration.

9. Apparatus according to claim 8, wherein said auxiliary signal generator comprises a modulator of interferometer structure receiving said received signal via a first port, and receiving said q superposed optical carrier waves via an opposite port.

10. Apparatus according to claim 8, wherein said auxiliary signal generator includes a semiconductor optical amplifying medium receiving via a first port a complement signal complementary to said received signal, and receiving said q superposed optical carrier waves via an opposite port.

* * * * *